United States Patent
Charlesworth et al.

(10) Patent No.: US 6,873,993 B2
(45) Date of Patent: Mar. 29, 2005

(54) INDEXING METHOD AND APPARATUS

(75) Inventors: Jason Peter Andrew Charlesworth, Haslemere (GB); Philip Neil Garner, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 185 days.

(21) Appl. No.: 09/863,424

(22) Filed: May 24, 2001

(65) Prior Publication Data

US 2002/0052870 A1 May 2, 2002

(30) Foreign Application Priority Data

Jun. 21, 2000 (GB) .............................................. 0015233

(51) Int. Cl.$^7$ .......................... G06F 17/00; G10L 15/04
(52) U.S. Cl. ...................................... 707/102; 704/251
(58) Field of Search ........................ 707/1–6, 100–102, 707/104.1; 704/231, 251

(56) References Cited

U.S. PATENT DOCUMENTS

| | | | |
|---|---|---|---|
| 4,227,176 A | 10/1980 | Moshier | 340/146.3 R |
| 4,736,429 A | 4/1988 | Niyada et al. | 381/43 |
| 4,903,305 A | 2/1990 | Gillick et al. | 381/41 |
| 4,975,959 A | 12/1990 | Benbassat | 381/41 |
| 4,980,918 A | 12/1990 | Bahl et al. | 381/43 |
| 4,985,924 A | 1/1991 | Matsuura | 381/43 |
| 5,075,896 A | 12/1991 | Wilcox et al. | 382/39 |
| 5,131,043 A | 7/1992 | Fujii et al. | 381/41 |
| 5,136,655 A | 8/1992 | Bronson | 381/41 |
| 5,202,952 A * | 4/1993 | Gillick et al. | 704/200 |
| 5,333,275 A | 7/1994 | Wheatley et al. | 395/2.52 |
| 5,390,278 A | 2/1995 | Gupta et al. | 395/2.52 |
| 5,500,920 A | 3/1996 | Kupiec | 395/2.79 |
| 5,577,249 A | 11/1996 | Califano | 395/611 |
| 5,594,641 A | 1/1997 | Kaplan et al. | 395/601 |
| 5,638,425 A | 6/1997 | Meador, III et al. | 379/88 |

(Continued)

FOREIGN PATENT DOCUMENTS

| | | | |
|---|---|---|---|
| EP | 0 597 798 A1 | 5/1994 | G06F/15/403 |
| EP | 0 649 144 B1 | 4/1995 | G11B/27/28 |
| EP | 0 689 153 A2 | 12/1995 | G06K/9/46 |
| EP | 0 789 349 A | 8/1997 | G10L/5/06 |
| EP | 0 849 723 A2 | 6/1998 | G10L/5/06 |
| GB | 2 302 199 A | 1/1997 | G06F/17/21 |
| GB | 2331816 | 6/1999 | G06F/17/30 |
| GB | 2 349 260 | 10/2000 | G10L/15/06 |
| WO | WO 98/47084 | 10/1998 | G06F/17/30 |
| WO | WO 99/05681 | 2/1999 | G11B/27/28 |
| WO | WO 00 31723 A | 6/2000 | G10L/15/02 |
| WO | WO 00/54168 | 9/2000 | G06F/17/00 |

OTHER PUBLICATIONS

Srinivasan et al. "Phonetic confusion matrix based spoken document retrieval", ACM 2000, pp. 81–87.*

(Continued)

*Primary Examiner*—Uyen Le
(74) *Attorney, Agent, or Firm*—Fitzpatrick, Cella, Harper & Scinto

(57) ABSTRACT

An indexing apparatus and method are described for use in identifying portions of data in a database for comparison with a query. In an embodiment, the index includes a key which comprises a sequence of phoneme classifications derived from the input query by classifying each of the phonemes in the input query with a number of phoneme classes, with the phonemes in each class being defined as those that are confusable with the other phonemes in the same class.

48 Claims, 12 Drawing Sheets

U.S. PATENT DOCUMENTS

| | | | | |
|---|---|---|---|---|
| 5,640,487 A | | 6/1997 | Lau et al. | 394/1.52 |
| 5,649,060 A | | 7/1997 | Ellozy et al. | 395/2.87 |
| 5,675,706 A | * | 10/1997 | Lee et al. | 704/256 |
| 5,680,605 A | * | 10/1997 | Torres | 707/3 |
| 5,684,925 A | | 11/1997 | Morin et al. | 395/2.63 |
| 5,708,759 A | | 1/1998 | Kemeny | 395/2.63 |
| 5,721,939 A | | 2/1998 | Kaplan | 395/759 |
| 5,729,741 A | | 3/1998 | Liaguno et al. | 395/615 |
| 5,737,489 A | | 4/1998 | Chou et al. | 395/2.65 |
| 5,737,723 A | | 4/1998 | Riley et al. | 704/243 |
| 5,752,227 A | | 5/1998 | Lyberg | 704/235 |
| 5,781,884 A | | 7/1998 | Pereira et al. | 704/260 |
| 5,787,414 A | | 7/1998 | Miike et al. | 707/2 |
| 5,799,267 A | | 8/1998 | Siegel | 704/1 |
| 5,835,667 A | | 11/1998 | Wactlar et al. | 386/96 |
| 5,852,822 A | * | 12/1998 | Srinivasan et al. | 707/4 |
| 5,870,740 A | | 2/1999 | Rose et al. | 707/5 |
| 5,873,061 A | | 2/1999 | Häb-Umbach et al. | 704/254 |
| 5,907,821 A | | 5/1999 | Kaji et al. | 704/4 |
| 5,983,177 A | | 11/1999 | Wu et al. | 704/244 |
| 5,999,902 A | | 12/1999 | Scahill et al. | 704/240 |
| 6,023,536 A | | 2/2000 | Visser | 382/310 |
| 6,026,398 A | | 2/2000 | Brown et al. | 707/5 |
| 6,061,679 A | | 5/2000 | Bournas et al. | 707/3 |
| 6,172,675 B1 | | 1/2001 | Ahmad et al. | 345/328 |
| 6,182,039 B1 | * | 1/2001 | Rigazio et al. | 704/257 |
| 6,192,337 B1 | | 2/2001 | Ittycheriah et al. | 704/231 |
| 6,236,964 B1 | | 5/2001 | Tamura et al. | 704/254 |
| 6,243,680 B1 | | 6/2001 | Gupta et al. | 704/260 |
| 6,272,242 B1 | | 8/2001 | Saitoh et al. | 382/187 |
| 6,314,400 B1 | | 11/2001 | Klakow | 704/257 |
| 6,321,226 B1 | | 11/2001 | Garber et al. | 707/10 |
| 6,389,395 B1 | | 5/2002 | Ringland | 704/254 |
| 6,487,532 B1 | * | 11/2002 | Schoofs et al. | 704/251 |
| 6,490,563 B2 | | 12/2002 | Hon et al. | 704/260 |
| 6,535,850 B1 | | 3/2003 | Bayya | 704/239 |
| 6,567,778 B1 | | 5/2003 | Chao Chang et al. | 704/257 |
| 6,567,816 B1 | * | 5/2003 | Desai et al. | 707/102 |
| 6,662,180 B1 | | 12/2003 | Aref et al. | 707/6 |

OTHER PUBLICATIONS

Okawa et al. "Automatic training of phoneme dictionary based on mutual information criterion", IEEE 1994, pp. 241–244.*

Rahim "A neural tree network for phoneme classification with experiments on the TIMIT database", IEEE 1992, pp. 345–348.*

Jokinin P et al: "A Comparison of Approximate String Matching Algorithms", Software Practice & Experience, GB, John Wiley & Sons Ltd., Chicester, vol. 26, No. 12, 1 Dec. 1996, pp. 1439–1458, XP000655612, ISSN: 0038-0644.

Besling S: "A statistical approach to multilingual phonetic transcription," Phillips Journal of Research, NL, Elsevier, Amsterdam, vol. 49, No. 4, 1995, pp. 367–379, XP004000261, ISSN: 0165-5817.

R Haeb–Umbach et al: "Automatic Transcription of Unknown Words in a Speech Recognition System", 0–7803-2431-5/95, 1995, IEEE, pp. 840–843.

M J Witbrock et al: "Using Words and Phonetic Strings for Efficient Information Retrieval from Imperfectly Transcribed Spoken Documents", School of Computer Sciences, Carnegie Mellon University, XP-002146047 1997 4 pages.

Kenny Ng: "Survey of Approaches to Information Retrieval of Speech Messages", Spoken Language Systems Group, Laboratory for Computer Science, Massachusetts Institute of Technology, Feb. 16, 1996, pp. 1–34.

Kenny Ng and Victor W. Zue: "Subword Unit Representations for Spoken Document Retrieval", Spoken Language Systems Group, MIT Laboratory for Computer Science, MA 02139, USA No Date 4 pages.

Kenny Ng and Victor W. Zue: "Phonetic Recognition for Spoken Document Retrieval", Spoken Language Systems Group, MIT Laboratory for Computer Science, MA 02139, USA 4 pages, No Date.

Martin Wechsler et al., "Spoken Document Retrieval Based on Phoneme Recognition", Dissertation submitted to the Swiss Federal Institute of Technology (ETH) Zurich, 1998, DISS.ETH No. 12879, pp. i–x and 1–121.

J.T. Foote et al., "Unconstrained keyword spotting using phone lattices with application to spoken document retrieval"; Computer Speech and Language (1997) 11, pp. 207–224.

Jerry H. Wright et al., "Statistical Models for Topic Identification Using Phoneme Substrings", IEEE, 1996, 0–7803-3192-3/96, pp. 307–310.

Yutaka Kobayashi et al: "Matching Algorithms between a Phonetic Lattice and Two Types of Templates—Lattice and Graph", Dept. of Computer Science, Kyoto Institute of Technology, IEEE, 1985, CH2118–/8/85/000–1597, pp. 1597–1600.

G. Micca et al: Three Dimensional DP for Phonetic Lattice Matching, International Conference on Digital Signal Processing, Fierence, Italy, 1987, pp. 547–551.

D.A. James, et al., "A Fast Lattice–Based Approach to Vocabulary Independent Wordspotting", 1994 IEEE Int. Conf. On Acoustics, Speech and Sig. Proc., 1994 ICASSP–94, Apr. 19–22, 1994, vol. 1, pp. I/377–I/380.

Steven Bird, et al., A Formal Framework for Linguistic Annotation, Technical Report, MS–CIS–99–01, Dept. of Computer & Information Science, Mar., 1999, Linguistic Data Consortium, University of PA, pp. 1–48.

L.R. Bahl et al., "A Method for the Construction of Acoustic Markov Models for Words", Oct. 1993, IEEE, Tansactions on Speech and Audio Processing, vol. 1, Issue 4, pp. 443–452.

Kai–Fu Lee, "Automatic Speech Recognition, The Development of the SPHINX System" Kluwer Academic Publishers, pp. 28–29 (1989).

P. Schmid et al., "Automatically Generated Word Pronunciations From Phoneme Classifier Output", Statistical Signal and Array Processing, Proc. of the Int'l Conf. on Acoustics, Speech and Signal Processing (ICASSP), IEEE, vol. 4, Apr. 27, 1993, pp. 223–226.

J. Skilling, "Classic Maximum Entropy", in J. Skilling (ed.), Maximum Entropy And Bayesian Methods, pp. 45–52 (1989) by Kluwer Academic Publishers.

E. Wold, et al., "Content–Based Classification Search, and Retrieval of Audio", IEEE Multimedia, vol. 3, No. 3, 1996, pp. 27–36.

N. Jain et al., "Creating Speaker–Specific Phonetic Templates With A Speaker–Independent Phonetic Recognizer, Implications For Voice Dialing", 1996 IEEE Int'l. Conf. On Acoustics, Speech & Signal Processing Conf. Proceedings, vol. 2, pp. 881–884.

Steve Cassidy et al., "EMU: An Enhanced Hierarchical Speech Data Management System", Proc. of the 6th Australian Speech Science & Technology Conf., Adelaide, 1996, pp. 381–386.

C. Berge, "Graphs & Hypergraphs", 1976, North Holland Mathematical Library, Amsterdam, pg. 175, XP–002192893.

P. Gelin et al., "Keyword Spotting For Video Soundtrack Indexing", 1996, IEEE Int. Conf. On Acoustics, Speech & Sig. Prc., 1996, ICASSP–96 Conf. Proceedings, vol. 1, pp. 299–302, May 7–10, 1996.

C. Gagnoulet et al., "Mairievox: A Voice–Activated Information System", Speech Communication, 10 (1991), pp. 23–31.

S. Srinivasan et al., "Phonetic Confusion Matrix Based Spoken Document Retrieval", Proc. of the 23rd Annual Int'l. ACM SIGIR Conf on Research & Development in Information Retrival Jul. 24–28, 2000, pp. 81–87.

J. Zobel et al. "Phonetic String Matching, Lessons From Information Retrieval", Sigir Forum, Assn. for Computing Machinery, New York, US, 1996, pp. 166–172, XP00087022.

Hsin–Min Wang, "Retrieval of Mandarin Spoken Documents Based On Syllable Lattice Matching", Pattern Recognition Letters, 21, pp. 615–624, Jun. 2000.

IBM, "Template Averaging For Adapting A Dynamic Time Warping Speech", IBM Technical Disclosure Bulletin, IBM Corp., NY, US, vol. 32, No. 11, Apr. 1, 1990, pp. 422–426, XP000097761, ISBN, 0018–8689.

D. Sankoff et al., "Time Warps, String Edits, and Macromolecules: The Theory And Practice of Sequence Comparison", CSLI Publications (1999) ISBN: 1–57586–217–4, pp. 1–44, 211–214, 311–321 and 359–362.

Steven Bird, et al., "Towards A Formal Framework For Linguistic Annotations", Linguistic Data Consortium, Univ. of PA., Dec., 1998.

J. Markowitz, "Using Speech Recognition", Prentice Hall, NJ, 1996, pp. 220–221.

F. Schiel et al., "The Partitur Format at BAS", In Proc. of the First Int'l. Conference on Language Resources and Evaluation, Granada, Spain, 1998 7 pages.

Gerber, C. "A Genral Approach To Speech Recognition", Proceedings of the Final Workshop on Multimedia Information Retrieval (Miro '95), Sep. 18, 1995, pgs. 1–12, Glasgow, Scotland, XP–02232856.

* cited by examiner

| IDX | KEY | POINTER |
|---|---|---|
| 0 | $c_2$ $c_9$ $c_1$ | n[2,15,4]; n[2,16,20] ... |
| 1 | $c_5$ $c_3$ $c_6$ | n[3,32,40]; n[15,10,22] ... |
| 2 | $c_5$ $c_5$ $c_8$ | n[8,14,20]; n[10,4,15] ... |
| 3 | $c_3$ $c_6$ $c_1$ | n[3,32,41]; n[4,14,3] ... |
| 4 | KEY-NULL | |
| 5 | $c_8$ $c_3$ $c_1$ | n[1,2,4]; n[3,10,4] ... |
| 6 | $c_1$ $c_7$ $c_5$ | n[2,1,12]; n[4,6,5] ... |
| . | . | . |
| . | . | . |
| . | . | . |
| S-2 | $c_2$ $c_2$ $c_4$ | n[3,1,15]; n[8,14,10] ... |
| S-1 | $c_4$ $c_{10}$ $c_3$ | n[1,5,43]; n[7,13,11] ... |

$q_0 \text{—} q_1 \text{—} q_2 \text{—} q_3 \text{—} q_4 \text{—} q_5$

Fig. 7a $$103 \begin{cases} q_0 & q_1 & q_2 \\ & q_1 & q_2 & q_3 \\ & & q_2 & q_3 & q_4 \\ & & & q_3 & q_4 & q_5 \end{cases}$$

Fig. 7b $$105 \begin{cases} C(q_0) & C(q_1) & C(q_2) \\ & C(q_1) & C(q_2) & C(q_3) \\ & & C(q_2) & C(q_3) & C(q_4) \\ & & & C(q_3) & C(q_4) & C(q_5) \end{cases}$$

Fig. 7c

INDEXING METHOD AND APPARATUS

The present invention relates to an apparatus and method for indexing sequences of sub-word units, such as sequences of phonemes or the like. The invention can be used to identify regions of a database for search in response to a user's input query. The input query may be a voiced or typed query.

Databases of information are well known and suffer from the problem of how to locate and retrieve the desired information from the database quickly and efficiently. Existing database search tools allow the user to search the database using typed key words. Whilst this is quick and efficient, this type of searching is not suitable for various kinds of databases, such as video or audio databases.

A recent proposal has been made to annotate such video and audio databases with a phonetic transcription of the speech content of the audio and video files, with subsequent retrieval being achieved by comparing a phonetic transcription of the user's input query with the phoneme annotation data in the database. The technique proposed for matching the sequences of phonemes firstly defines a set of features in the query, each feature being taken as an overlapping fixed size fragment from the phoneme string. It then identifies the frequency of occurrence of the features in both the query and the annotation and then finally determines a measure of the similarity between the query and the annotation using a cosine measure of these frequencies of occurrences.

However, as those skilled in the art will appreciate, if the database is large, then this retrieval method becomes unfeasibly long. An indexing method is therefore required.

As is well known, indexing provides a one-to-many mapping between the index (sometimes referred to as the key) and the data in the database. Where the database comprises words, this indexing is simple, but for phonemes this raises a number of difficulties. Firstly, because there are only a small number of phonemes (approximately 43 in the English language) means that a naive mapping using a single phoneme as a key is not sufficiently discriminating, since any given phoneme will occur several thousand times in the database. Secondly, because of the relatively poor recognition rate of phonemes (60% to 70%) means that any one-to-many mapping will make it difficult to retrieve data where the query phoneme or annotation phoneme was misrecognised, inserted or omitted. Finally, performing any statistical retrieval methods becomes computationally unfeasible.

The present invention aims to provide an efficient sub-word indexing technique which can be used in a retrieval system to identify areas of a database for searching.

Exemplary embodiments of the present invention will now be described with reference to the accompanying drawings, in which.

Figure 1:
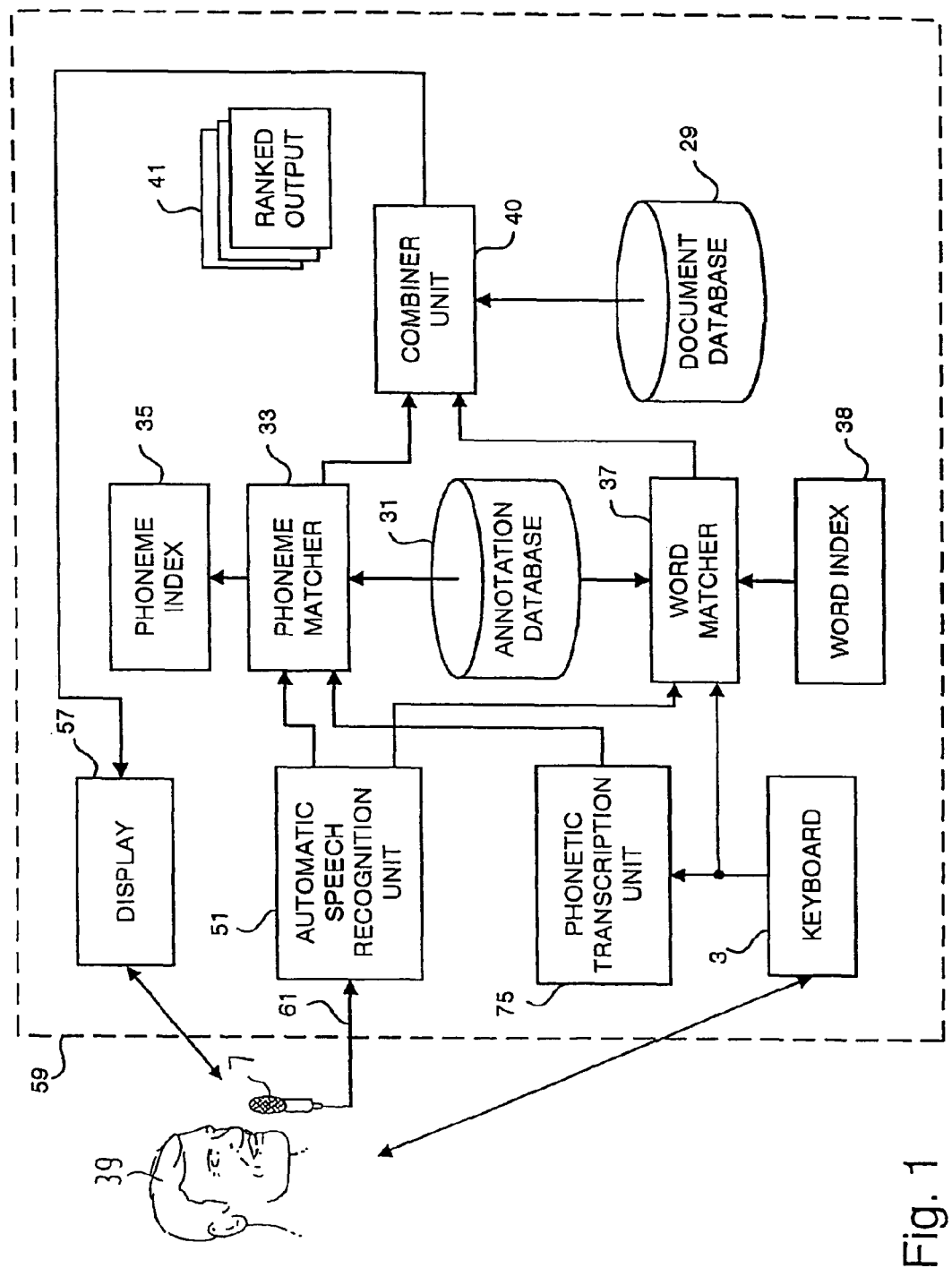
FIG. 1 is a schematic block diagram illustrating a user terminal which allows the user to retrieve information from an input typed or voice query.
Figure 3A:
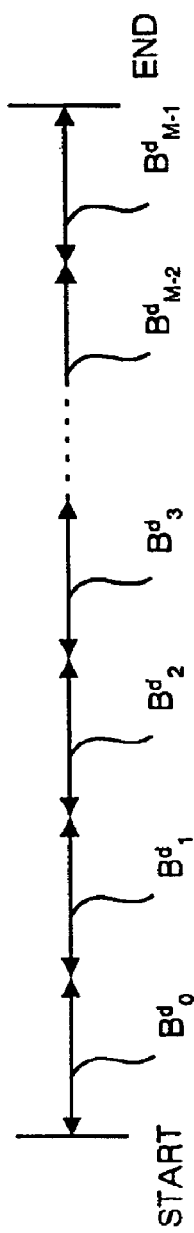
Figure 3B:
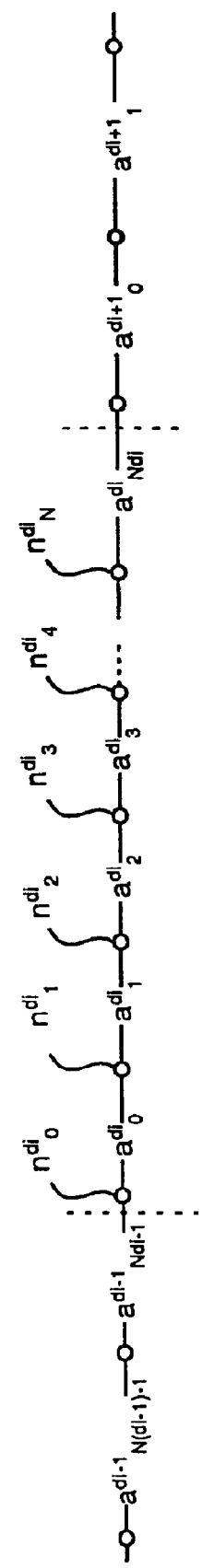
Figure 3C:
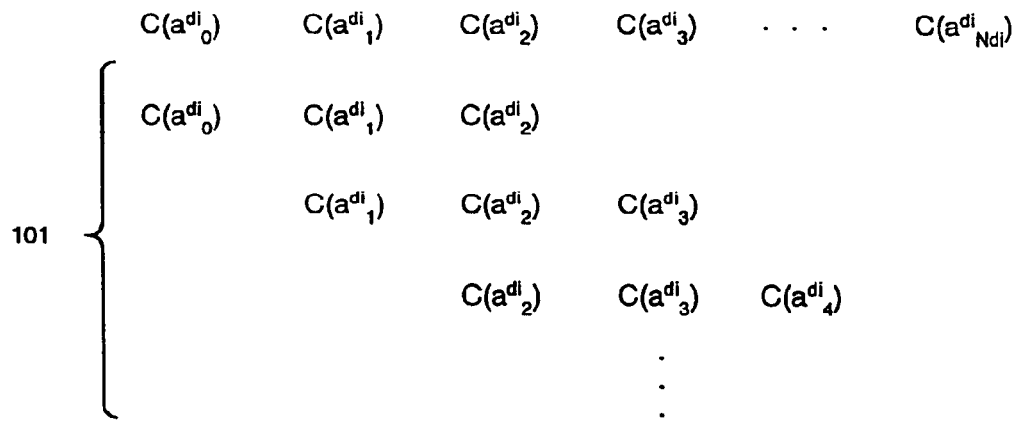
Figure 4:
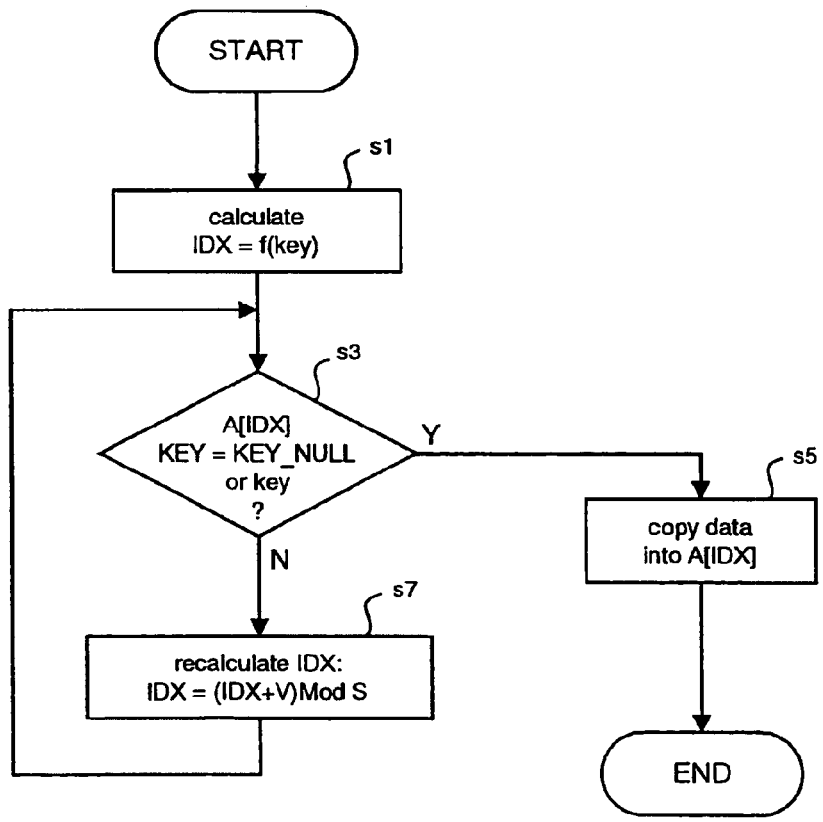
Figure 6:
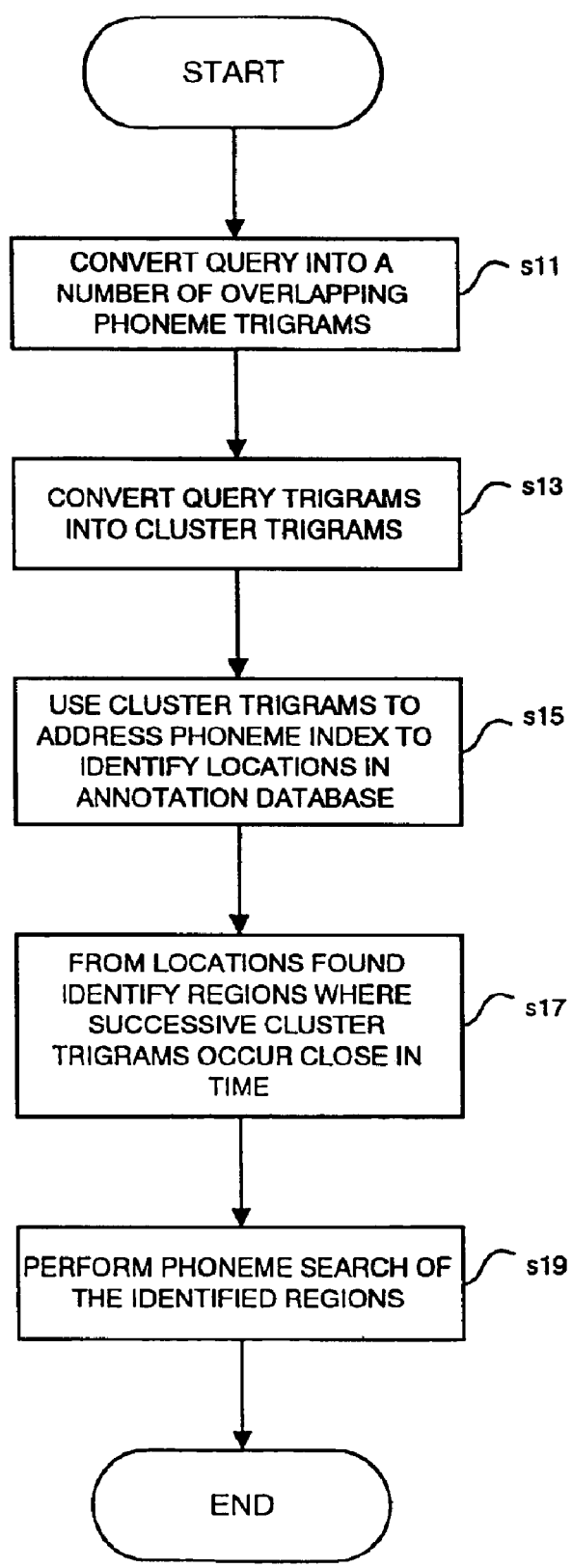
Figure 8:
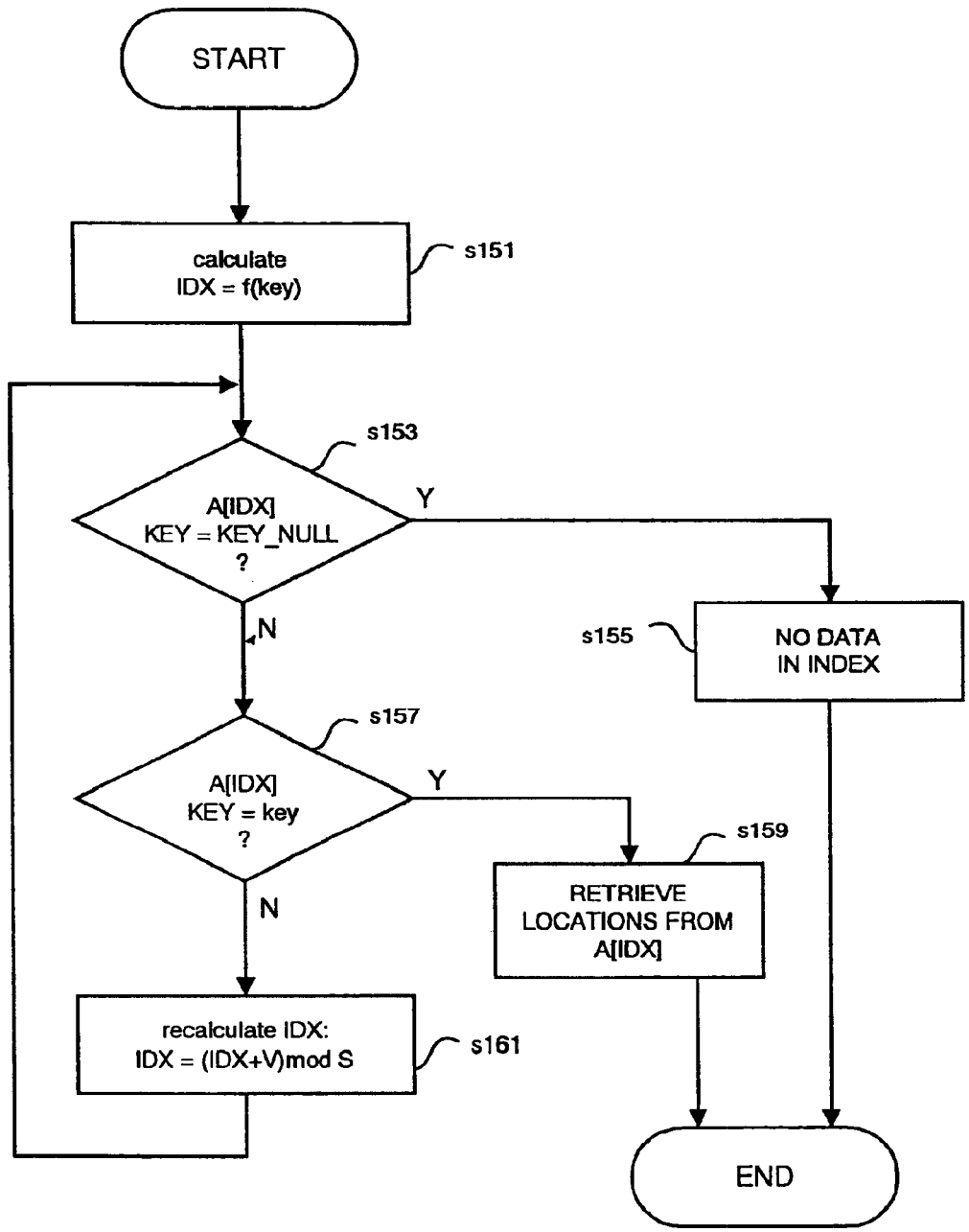
Figure 9A:
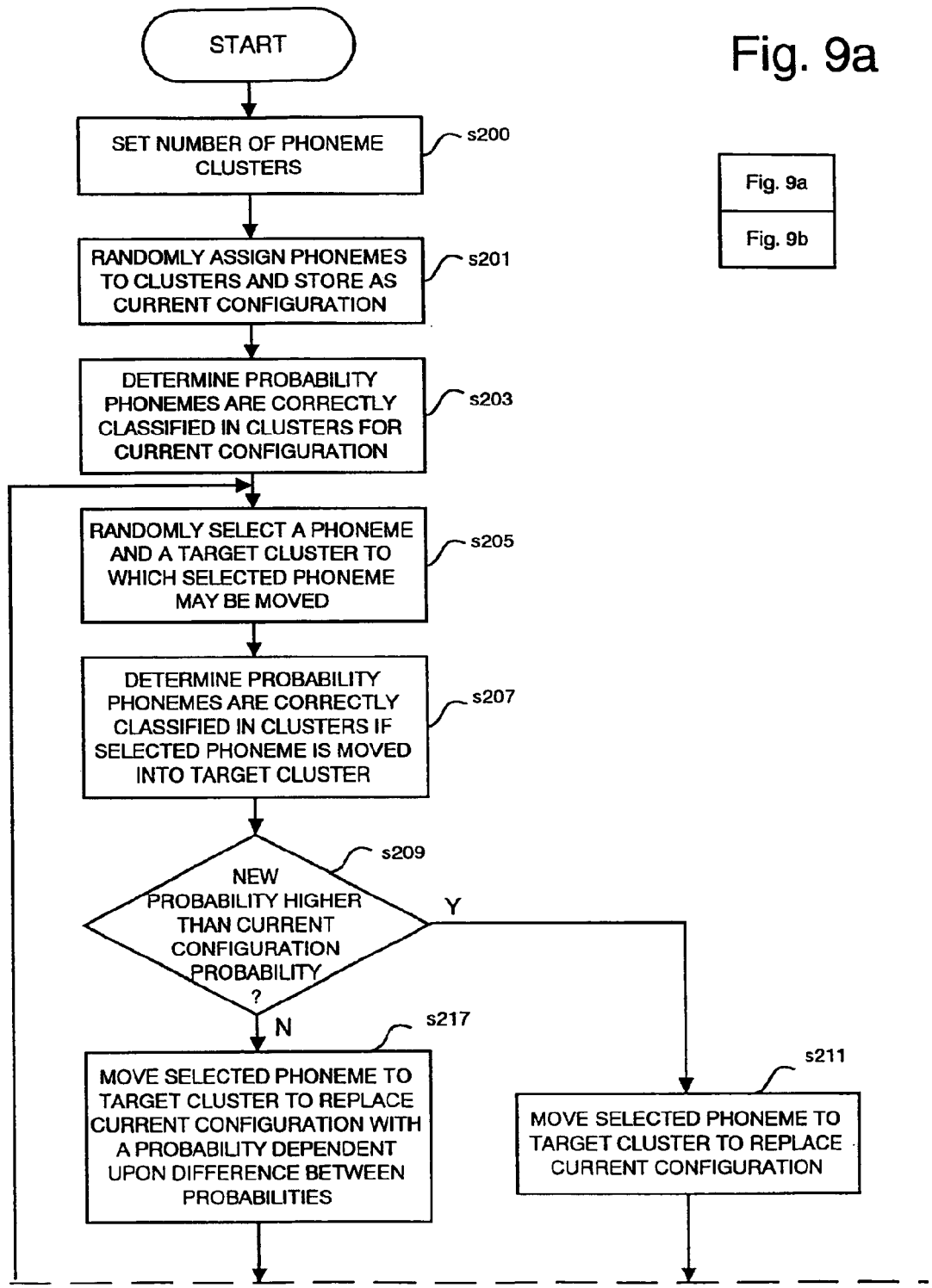
Figure 9B:
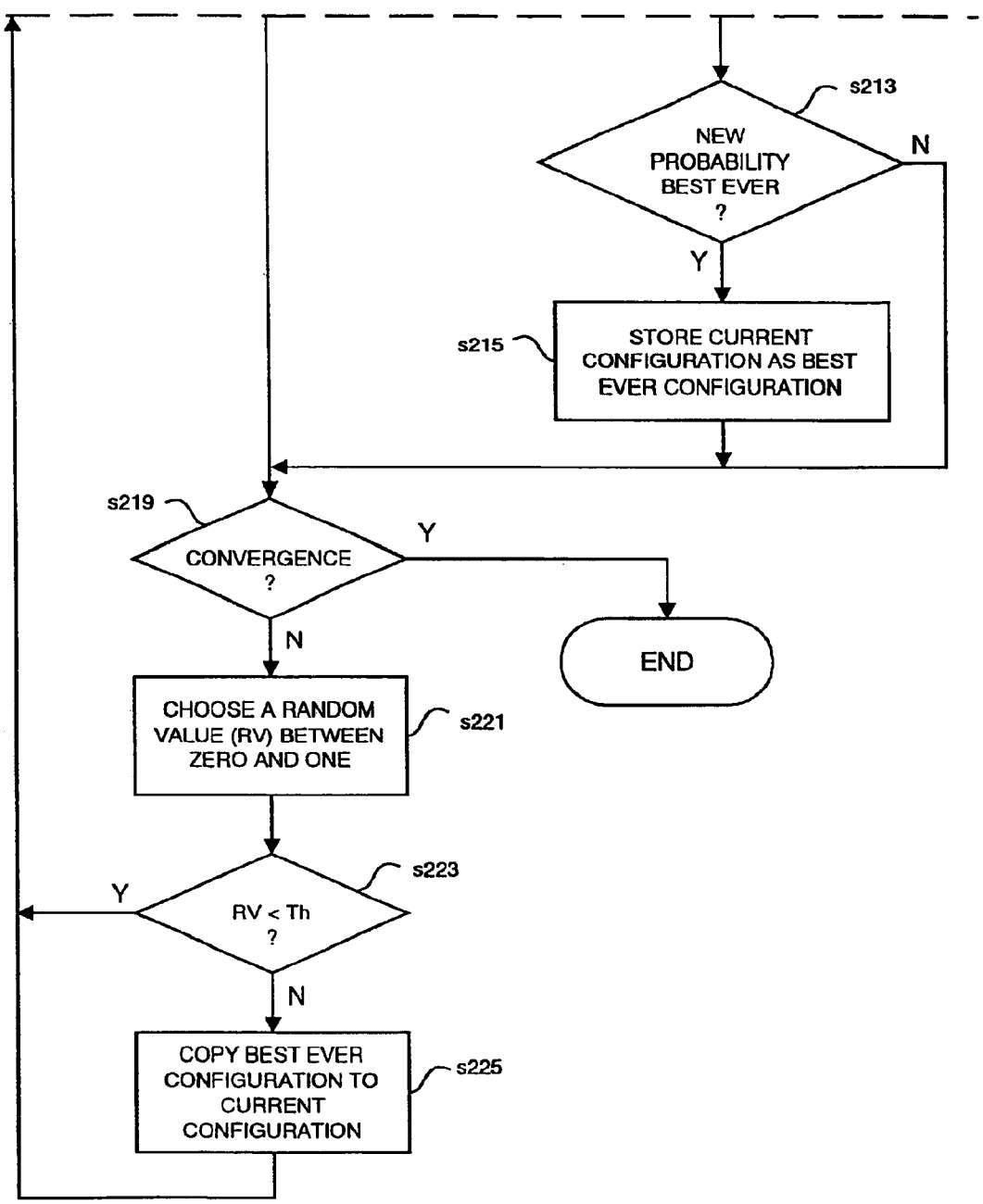
Figure 10:
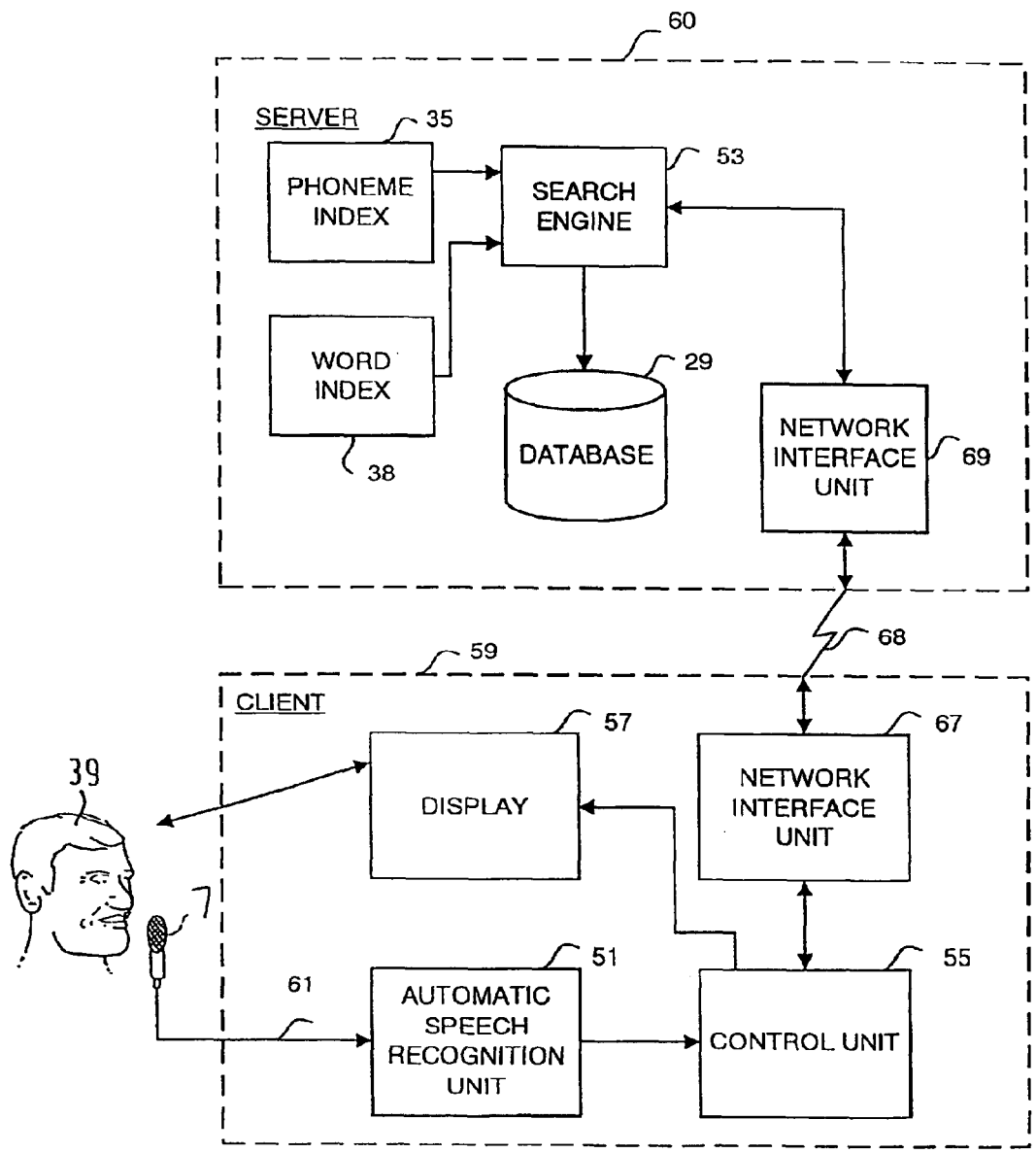
Figure 11:
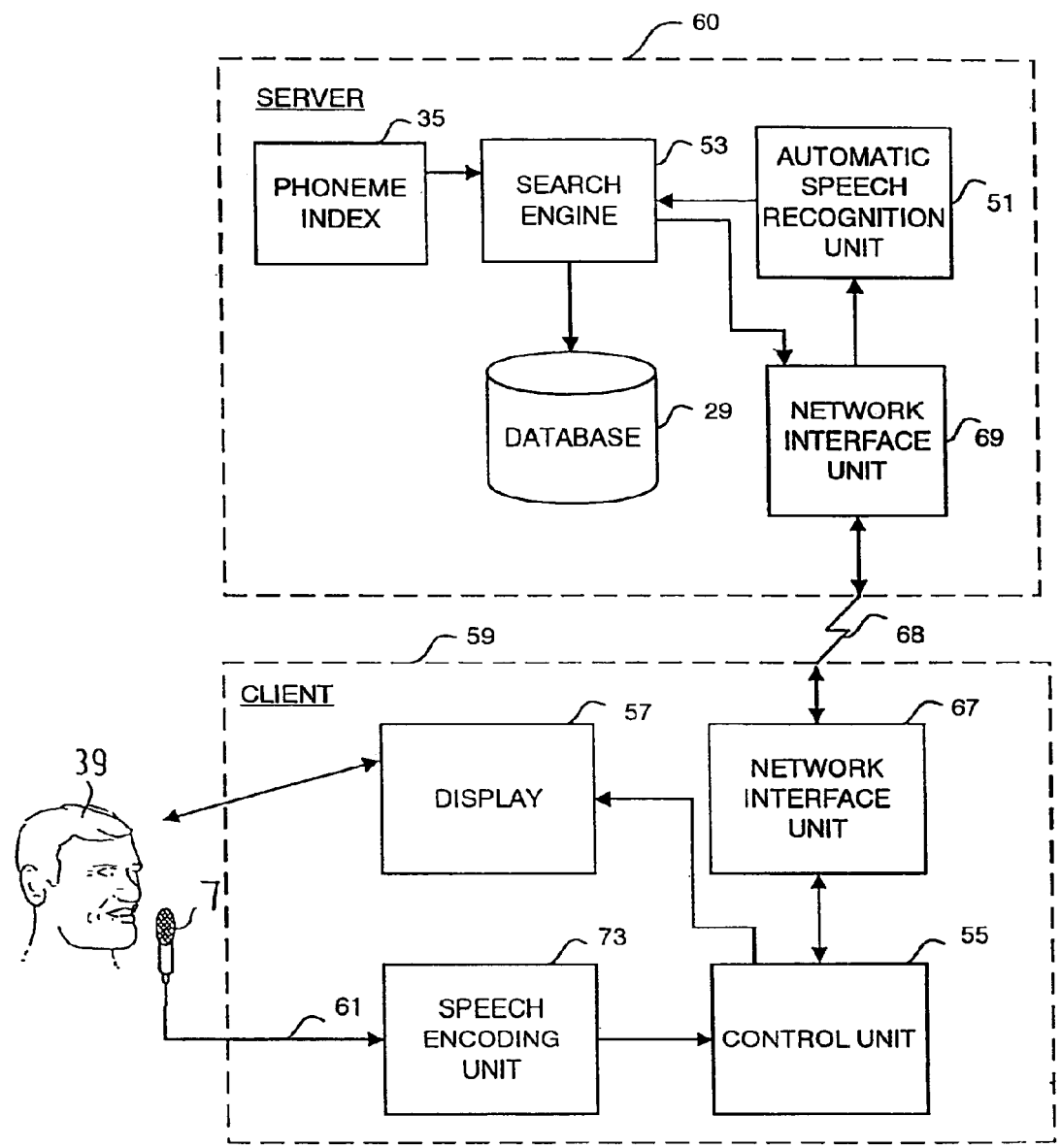

FIG. 3a diagrammatically illustrates the block nature of an annotation stored in the annotation database which forms part of the user terminal shown in FIG. 1;

FIG. 3b is a schematic diagram illustrating a sequence of annotation phonemes which is included in one of the blocks of the annotation shown in FIG. 3a;

FIG. 3c schematically illustrates a sequence of phoneme clusters for the phoneme sequence shown in FIG. 3b and illustrates how these phoneme clusters can be grouped to form a number of overlapping phoneme cluster N-grams;

FIG. 4 is a flowchart illustrating the main processing steps involved in creating a phoneme index;

FIG. 5 illustrates an example of a phoneme index which is generated during the processing of the steps shown in FIG. 4;

FIG. 6 is a flowchart illustrating the processing steps involved in performing a phoneme search of an annotation database;

FIG. 7a schematically illustrates a sequence of phonemes representing an input query;

FIG. 7b schematically illustrates the way in which the sequence of phonemes shown in FIG. 7a can be divided into a number of overlapping phoneme N-grams;

FIG. 7c illustrates a number of overlapping phoneme cluster N-grams derived from the phoneme N-grams shown in FIG. 7b;

FIG. 8 is a flowchart illustrating the main processing steps involved in using the phoneme index to identify locations of the annotation for phoneme matching;

FIG. 9a is a flowchart illustrating part of the process steps involved in determining the different phoneme clusters;

FIG. 9b is a flowchart illustrating the remaining process steps involved in determining the different phoneme clusters;

FIG. 10 is a schematic block diagram illustrating the form of an alternative user terminal which is operable to retrieve a data file from a database located within a remote server in response to an input voice query; and FIG. 11 illustrates another user terminal which allows a user to retrieve data from a database located within a remote server in response to an input voice query.

Embodiments of the present invention can be implemented using dedicated hardware circuits, but the embodiment to be described is implemented in computer software or code, which is run in conjunction with processing hardware such as a personal computer, work station, photocopier, facsimile machine, personal digital assistant (PDA), web browser or the like.

Data File Retrieval

FIG. 1 is a block diagram illustrating the form of a user terminal 59 which is used, in this embodiment, to retrieve documents from a document database 29 in response to a voice or typed query input by the user 39. The "document" may be text documents, audio files, video files, photographs, mixtures of these etc. The user terminal 59 may be, for example, a personal computer, a hand-held device or the like. As shown, the user terminal 59 comprises the document database 29, an annotation database 31 comprising a descriptive annotation of each of the documents in the document database 29, a phoneme matcher 33, a phoneme index 35, a word matcher 37, a word index 38, a combiner unit 40, an automatic speech recognition unit 51, a phonetic transcription unit 75, a keyboard 3, a microphone 7 and a display 57.

In operation, the user inputs either a voice query via the microphone 7 or a typed query via the keyboard 3 and the query is processed either by the automatic speech recognition unit 51 or the phonetic transcription unit 75 to generate corresponding phoneme and word data. The phoneme data is input to the phoneme matcher 33 which is operable to perform a phoneme search in the annotation database 31 with reference to a phoneme index 35. Similarly, the word data is input to the word matcher 37 which is operable to search the annotation database 31 with reference to the word index 38. The results of the phoneme and word search of the annotation database are then input to the combiner unit 40 which uses these results to retrieve a ranked list of documents 41 from the document database 29 which are output to the display unit 57 for display to the user 39.

Figure 2:
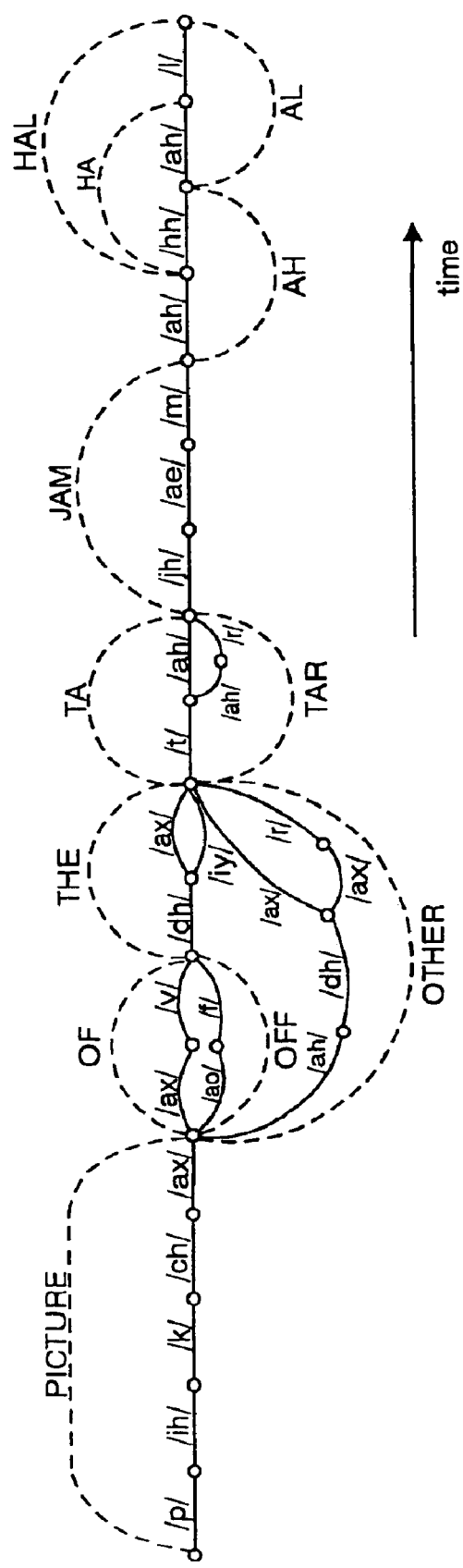
FIG. 2 is a schematic diagram of phoneme and word lattice annotation data which is generated from a voiced input by the user for annotating a document.

In this embodiment, the annotation data for each document comprises a combined phoneme (or phoneme-like) and word lattice. FIG. 2 illustrates the form of the phoneme and word lattice annotation data generated for the spoken annotation "picture of the Taj Mahal". As shown, the phoneme and word lattice is an acyclic directed graph with a single entry point and a single exit point. It represents different parses of the user's input. It is not simply a sequence of words with alternatives, since each word does not have to be replaced by a single alternative, one word can be substituted for two or more words or phonemes, and the whole structure can form a substitution for one or more words or phonemes. Therefore, the density of the data within the phoneme and word lattice annotation data essentially remains linear throughout the annotation data, rather than growing exponentially as in the case of a system which generates the N-best word lists for the annotation input.

In this embodiment, the annotation data for each document (d) is stored in the annotation database 31 and has the following general form:

HEADER
flag if word if phoneme if mixed
time index associating the location of blocks of annotation data within memory to a given time point.
word set used (i.e. the dictionary)
phoneme set used
the language to which the vocabulary pertains
phoneme probability data
Block(i) i=0, 1, 2, . . .
node $n_j$ j=0, 1, 2, . . .
  time offset of node from start of block
  phoneme links (k) k=0, 1, 2 . . . offset to node $n_j=n_k-n_j$ ($n_k$ is node to which link K extends) or if $n_k$ is in block(i+1) offset to node $n_j=n_k+N_b-n_j$ (where $N_b$ is the number of nodes in block(i)) phoneme associated with link (k)
  word links (l) l=0, 1, 2, . . . offset to node $n_j=n_i-n_j$ ($n_j$ is node to which link l extends) or if $n_k$ is in block(i+1) offset to node $n_j=n_k+N_b-n_j$(where $N_b$ is the number of nodes in block(i)) word associated with link (l)

The flag identifying if the annotation data is word annotation data, phoneme annotation data or if it is mixed is provided since the annotation data may include just word data, just phoneme data or both word and phoneme data.

In this embodiment the annotation data is divided into blocks (B) of nodes (n) in order to allow the search to jump into the middle of the annotation data. The header therefore includes a time index which associates the location of the blocks of annotation data within the memory to a given time offset between the time of start and the time corresponding to the beginning of the block.

The header also includes data defining the word set used (i.e. the dictionary), the phoneme set used and their probabilities and the language to which the vocabulary pertains. The header may also include details of the automatic speech recognition system or the phonetic transcription system used to generate the annotation data and any appropriate settings thereof which were used during the generation of the annotation data.

The blocks of annotation data then follow the header and identify, for each node in the block, the time offset of the node from the start of the block, the phoneme links which connect that node to other nodes by phonemes and word links which connect that node to other nodes by words. Each phoneme link and word link identifies the phoneme or word which is associated with the link. They also identify the offset to the current node. For example, if node $n_{50}$ is linked to node $n_{55}$ by a phoneme link, then the offset to node $n_{50}$ is 5. As those skilled in the art will appreciate, using an offset indication like this allows the division of the continuous annotation data into separate blocks.

In an embodiment where an automatic speech recognition unit outputs weightings indicative of the confidence of the speech recognition unit's output, these weightings or confidence scores would also be included within the data structure. In particular, a confidence score would be provided for each node which is indicative of the confidence of arriving at the node and each of the phoneme and word links would include a transition score depending upon the weighting given to the corresponding phoneme or word. These weightings would then be used to control the search and retrieval of the data files by discarding those matches which have a low confidence score.

In order to provide an efficient retrieval method, a word indexing scheme and a phoneme indexing scheme is used in order to identify portions in the annotation database 31 against which a direct comparison with the input query is made. The word index 38 and the way that it is used is well known to those skilled in the art and will not be described further. However, the way in which the phoneme index 35 is generated and subsequently used to identify portions of the annotation database 31 for comparison with the input query will now be described in more detail.

As mentioned above, the use of a single phoneme as the key for a phoneme index will not provide sufficient discrimination, since each phoneme will occur several thousand times in the annotation database 31. Further, since current automatic speech recognition systems have a relatively poor phoneme recognition rate (60 to 70%), indexing using the phonemes directly will make it difficult to retrieve the data where the query phoneme or the annotation phoneme was misrecognised. Since the automatic speech recognition system tends to produce decoding errors for similar sounding phonemes, such as /s/ and /z/ and not highly dissimilar phonemes, such as /z/ and /g/, the error rate of indexing can be greatly reduced by indexing on confusable clusters of phonemes rather than individual phonemes.

Considering, for example, the situation where a query and an annotation exist for the word "sheep" and the query (Q) comprises the sequence of phonemes /sh//iy//p/ and the annotation (A) comprises the sequence of phonemes /s//eh//p/. If the sequence of three query phonemes is used as an index into the annotation (in the form of a trigram), then it will not be possible to retrieve the data since the sequence of query phonemes does not match the sequence of annotation phonemes. However, if the phonemes are clustered into confusable sets, and the phonemes in the query and in the annotation are classified into their respective sets, then there is a better chance that there will be a match between the query and the annotation if they both sound alike. For example, if the following phoneme classifications are defined:

$C_1 = \{/s/ \quad /z/ \quad /sh/ \quad /zh/\}$ $C_2 = \{/t/ \quad /k/ \quad /g/ \quad /b/ \quad /p/\}$ -continued $$C_5 = \{/eh/ \quad /ih/ \quad /iy/\}$$

⋮ and the query phonemes and the annotation phonemes in the above illustration are classified into these classes, then this will result in the following cluster trigrams:

$C(Q)=\{C_1\ C_5\ C_2\}$ $C(A)=\{C_1\ C_5\ C_2\}$

Therefore, matching using the clustered query and annotation will now work since C(Q)=C(A) and the data can be retrieved.

In this embodiment, a hash indexing technique is used which tries to create a unique mapping between a key and an entry in a list. In this embodiment trigrams of the above phoneme clusters are used as the key to the index. The way that the phoneme index 35 is created and used will now be described in more detail.

In order to create the phoneme index 35 the phoneme annotation data stored in the annotation database 31 is converted into phoneme cluster trigrams. The way that this is achieved is illustrated in FIG. 3. In particular, FIG. 3a schematically illustrates the block form of the annotation data which is stored in the database 31 for one of the documents (d) stored in the document database 29. As shown, the annotation data comprises successive blocks of data $B_0^d$ to $B_{M-1}^d$. As mentioned above, the annotation data within each block includes the nodes within the block and the phoneme and word links which are associated with the nodes. In order to illustrate the indexing method used in this embodiment, the remaining description will assume that the annotation data for document d includes a canonical sequence of phonemes i.e. one with no alternatives. FIG. 3b illustrates the canonical sequence of phonemes within the $i^{th}$ block for the annotation data for document d. As shown, block $B_i^d$ comprises the canonical sequence of phonemes $a_0^{di}$ to $a_{Ndi}^{di}$ which extend between nodes $n_0^{di}$ to $n_{Ndi}^{di}$. FIG. 3c illustrates the overlapping "cluster trigrams" 101 generated for the sequence of annotation phonemes in block $B_i^d$ shown in FIG. 3b. As shown in FIG. 3c, the cluster in which each of the annotation phonemes in block $B_i^d$ belongs is determined. Then cluster trigrams are determined from overlapping groups of three cluster identifications for the sequence of annotation phonemes. In particular, the first cluster trigram determined is $C(a^{di}_0)\ C(a^{di}_1)\ C(a^{di}_2)$ then cluster trigram $C(a^{di}_1)\ C(a^{di}_2)\ C(a^{di}_3)$ etc. Although not shown in FIG. 3c, it is also necessary to consider the trigrams which bridge adjacent blocks. For example, in this embodiment, it would be necessary to consider the following cluster trigrams: $C(a^{di-1}_{N(di-1)-1})\ C(a^{di-1}_{Ndi-1})\ C(a^{di}_0)$ and cluster trigram $C(a^{di-1}_{Ndi-1})\ C(a^{di}_0)\ C(a^{di}_1)$.

To create the index, a large table or array, A, having S entries is created. In this embodiment, each entry is addressed by an index (IDX) which takes a value between zero and S-1 and each entry includes a data field to store the key (KEY) associated with the entry and a data field to store the pointers which identify the relevant locations within the annotation database where the phoneme data associated with the KEY can be found. Initially each of the entries is empty. The size of the table depends on the number of different phoneme clusters and the number of cluster identifications in the key. In this case, three cluster identifications (trigrams) are provided in each key. If there are ten clusters, then the number of different possible keys is $3^{10}$. Therefore, in this case, S should, theoretically be made approximately equal to $3^{10}$. However, in practice, some of the possible keys are unlikely to occur. Therefore, the size of the index can be set to have some initial size and data can be added to the index until more than a predetermined percentage of the entries are full. At this point, a bigger table can be created and the data from the old table copied over to the new table. This process can be repeated until there is no more data to be added to the index. Although this means that some memory is wasted, this is insignificant compared to the memory required for the pointers which will be stored in the table.

The way that data is added to the table will now be explained with reference to FIG. 4. As shown, in step s1, the system calculates the value of a function (f(KEY)) which is dependent upon the key, i.e. a function of the current cluster trigram, which value is used as the index (IDX) into the table A. In particular, the function f(KEY) defines a mapping between the cluster trigram and an entry in the table A and always yields a number between zero and S-1. In this embodiment, the function used is:

$$[C[1]K_c C[2]K_c C[3]K_c] \bmod S \qquad (1)$$

where $K_c$ is the number of phoneme clusters and C[1] is the number of the cluster to which the first annotation phoneme in the trigram belongs, C[2] is the number of the cluster to which the second annotation phoneme in the trigram belongs and C[3] is the number of the cluster to which the third annotation phoneme belongs. For example, for the illustration above where $C(A)=\{c_1 c_5 c_2\}$, C[1]=1, C[2]=5 and C[3]=2.

Once IDX has been determined in step s1, the processing proceeds to step s3 where the system checks the corresponding entry in the table, A, and determines whether or not the key stored in that entry (KEY) is the same as the key for the current phoneme cluster trigram (key) or is the null key (indicating that this entry is empty). If in step s3 the system determines that the key stored in the entry (KEY) matches the current key (key) or the null key, then the processing proceeds to step s5 where a pointer is added to that entry of the table, A, which points to the node associated with the first phoneme in the phoneme trigram associated with the current input key. For example, for the key $c(a_0^{di})\ c(a_1^{di})\ c(a_2^{di})$, the data which would be added to the table would be a pointer which points to the node $n_0^{di}$ since annotation phoneme $a_0^{di}$ is associated with node $n_0^{di}$. If the key stored in the entry is currently the null key, then in step s5, the system also changes the key for the entry (KEY) to the current key (key). The processing of the current cluster trigram then ends and a similar processing is performed on the next cluster trigram. If at step s3, the processing determines that the $IDX^{th}$ entry in the table, A, has already been assigned to a different cluster trigram, then the processing proceeds to step s7 where the system tries another entry in the table by changing the value of IDX in some predetermined way. In this embodiment, this is achieved by calculating:

$$IDX=(IDX+V) \bmod S \qquad (2)$$

where V is some fixed number which is not a factor of S (other than 1). The reason that V should not be a factor of S is that this ensures that all entries in the table are tried. For example, if S=10 and V=2 then this technique would simply keep trying either just the odd or just the even entries of table A. In order to avoid this problem, S should preferably be prime. After step s7, the processing returns to step s3.

Once all the cluster trigrams in all the blocks of each annotation have been processed in this way, the table, A, is stored as the phoneme index 35. FIG. 5 illustrates the form of a phoneme index that is generated by the above processing. As can be seen from FIG. 5, each entry in the table includes the index number (IDX) of the entry, the key (KEY) associated with the entry and (if the key is not the null key) one or more pointers pointing to nodes in the annotation database 31. As shown, in this embodiment, these pointers have the form n[p,q,r] where p is the annotation for document p, q is the $q^{th}$ block of nodes within that annotation data and r is the $r^{th}$ node within that block.

The way that the phoneme matcher 33 uses the phoneme index 35 in response to an input query in order to identify portions of the annotation database 31 for matching with the input query will now be described with reference to FIGS. 6 to 8.

When a user inputs a query the phoneme data generated either by the automatic speech recognition unit 51 or the phonetic transcription unit 75 (depending upon whether the input query was received through the microphone or through the keyboard) is input to the phoneme matcher 33. FIG. 6 illustrates the processing steps performed by the phoneme matcher 33 on this phoneme data. As shown, in step s11, the phoneme matcher 33 converts the received query phoneme data into overlapping phoneme trigrams. FIG. 7a illustrates a sequence of query phonemes $q_0$ to $q_5$ representative of phoneme data received by the phoneme matcher 33 and FIG. 7b illustrates how this sequence of query phonemes is converted into five overlapping trigrams of query phonemes 103. The processing then proceeds to step s13 where each of the query phoneme trigrams is converted into phoneme cluster trigrams 105, as illustrated in FIG. 7c, by classifying each of the query phonemes in the phoneme trigram into one of the above classes or clusters. The processing then proceeds to step s15 where the phoneme matcher 33 uses each of the cluster trigrams generated for the input query to address the phoneme index 35 in order to identify relevant locations in the annotation database 31.

FIG. 8 illustrates the processing steps used by the phoneme matcher 33 in carrying out step s15. As shown, in step s151, the phoneme matcher 33 calculates the index (IDX) for the entry in the table, A, by inserting the current query cluster trigram into the function defined above in equation (1). The processing then proceeds to step s153 where the phoneme matcher 33 checks the corresponding entry in the table, A, and determines whether or not the key stored in that entry (KEY) is the null key (indicating that this entry is empty). If it is, then the processing proceeds to step s155 where the phoneme matcher 33 determines that there is no corresponding annotation in the annotation database and outputs an appropriate output to the combiner unit 40. The processing then ends.

If at step s153 the phoneme matcher 33 determines that the key stored in the entry (KEY) is not equal to the null key, the processing proceeds to step s157 where the phoneme matcher 33 determines whether or not the key stored in the entry (KEY) is the same as the key for the current query cluster trigram (key). If it is then the processing proceeds to step s159 where the phoneme matcher 33 retrieves the pointers from that entry. The processing then ends. If, however, the phoneme matcher 33 determines, in step s157, that the key for the entry (KEY) does not equal the key for the current query cluster trigram (key), then the processing proceeds to step s161 where the phoneme matcher tries another entry in the table by changing the value of the index (IDX) using equation (2) given above and then returning to step s153.

Once the phoneme matcher 33 retrieves the pointers from the index or determines that there is no data stored for the current query cluster trigram, the phoneme matcher 33 then performs a similar processing for the next query cluster trigram until all the query cluster trigrams have been processed in this way. The processing then proceeds to step s17 shown in FIG. 6, where the phoneme matcher 33 uses the pointers identified in step s15 to identify regions within the annotation database 31 which will be matched with the actual phoneme data received by the phoneme matcher 33. In this embodiment, these regions are identified by comparing the pointers retrieved in step s159 for successive query cluster trigrams and looking for pointers which point to portions in the annotation database 31 which are next to each other. For example, referring to the phoneme index illustrated in FIG. 5, if the $n^{th}$ query cluster trigram is $c_5c_3c_6$ and the $n+1^{th}$ query cluster trigram is $c_3c_6c_1$, then the phoneme matcher 33 will identify node 40 of the $32^{nd}$ block of annotation data for the $3^{rd}$ document as being a region of the annotation database for further processing in step s19. This is because the pointers stored in the phoneme index 35 for the key $c_5c_3c_6$ includes a pointer to node n[3,32,40] and the pointers stored in the phoneme index 35 for the key $c_3c_6c_1$ includes a pointer to node n[3,32,41], which is immediately after node n[3,32,40] and is therefore consistent with a portion of an annotation having successive cluster trigrams $c_5c_3c_6$ and then $c_3c_6c_1$ which may match with the input query.

After the phoneme matcher 33 has identified the regions in step s17, it performs a phoneme comparison between the received query phoneme data and the phoneme data stored in the annotation database 31 at the regions identified in step s17. This phoneme comparison can be performed by comparing M-grams of the query with similar M-grams of the annotation (as described in the applicant's earlier UK application GB 9905201.1, the content of which is incorporated herein by reference) or by performing a dynamic programming comparison between the sequence of query phonemes and the sequence of annotation phonemes (using, for example, one of the techniques described in the applicant's earlier UK application GB 9925574.7, the content of which is incorporated herein by reference). The results of these phoneme comparisons are then output to the combiner unit 40 where the results are combined with the output from the word matcher 37 in order to retrieve and rank the appropriate documents from the document database 29.

In the above description, it has been assumed that the phonemes have been classified into a number of sets of confusable phonemes. The way that these phoneme clusters are determined in this embodiment will now be described. If two phoneme decodings have been made, once during the annotation phase and once during the query phase, then the probability of the two decodings, $p_1$ and $p_2$, coming from the same source is given by:

$$P(p_1,p_2|m_1,m_2)=\Sigma_x P(p_1|x,m_1)P(p_2|x,m_2)P(x) \qquad (3)$$

where P(p|x,m) is the probability of decoding phoneme x as phoneme p when decoding method m is used and P(x) is the probability of phoneme x occurring. The decoding methods $m_1$ and $m_2$ need to be distinguished since one of the decodings may come from a text-to-phoneme converter within the phonetic transcription unit 75 whilst the other may come from the automatic speech recognition unit 51 and these two different decoding techniques will suffer from different types of confusion. Each of these probabilities in equation (3) above can be determined in advance during a training routine by applying known speech to the automatic speech recognition unit 51 and known text into the phonetic transcription unit 75 and by monitoring the output from the recognition unit 51 and the phonetic transcription unit 75 respectively. The way that such a training routine would be performed will be well known to those skilled in the art and will not, therefore, be described further here.

If it is assumed that there are $K_c$ phoneme clusters or classes and for each cluster there is a many-to-one mapping between decoded phonemes and the clusters. This mapping will depend on the decoding method employed. For example, an /s/ decoded by the automatic speech recognition unit 51 may be in cluster $c_4$, but an /s/ decoded by the phonetic transcription unit 75 may be in cluster $c_2$. Therefore, for any particular cluster ($K_i$) there will be a probability that two decodings from the same source are classed into that cluster which is determined by summing the probability given in equation (3) above for all possible combinations of decodings, $p_1$ and $p_2$, which belong to that cluster, i.e. by calculating:

$$P\left(\begin{array}{c}\text{Assigned to}\\\text{same cluster}\end{array}\middle| K_i\right) = \sum_{p_1 \in K_i} \sum_{p_2 \in K_i} P(p_1, p_2, | m_1, m_2) \quad (4)$$

The probability that all decodings are correctly classified is therefore given by:

$$P\left(\begin{array}{c}\text{All correctly}\\\text{classified}\end{array}\right) = \prod_{i=1}^{K_c} P\left(\begin{array}{c}\text{Assigned to}\\\text{same cluster}\end{array}\middle| K_i\right) \quad (5)$$

The task of defining the clusters aims, therefore, to maximise P(all correctly classified), subject to the constraints that each phoneme (via a particular decoding method) is in one and only one cluster. In this embodiment, a Monte Carlo algorithm is used in order to determine phoneme classifications which maximise this probability.

FIG. 9a illustrates the steps involved in this Monte Carlo algorithm. Initially, in step s200, the number of phoneme clusters that will be used is determined. As those skilled in the art will appreciate, if there are too few clusters then there will be insufficient discrimination and if there are too many clusters then the data may not be retrievable. In this embodiment, in order to provide classifications which are sufficiently discriminative, ten clusters are defined. Once the number of clusters has been determined, the system randomly assigns, in step s201, phonemes to these clusters and stores this as a current configuration. The processing then proceeds to step s203 where the system determines the probability that the phonemes are correctly classified in the clusters for the current configuration, i.e. the system calculates the probability given in equation (5) above.

The processing then proceeds to step s205 where the system randomly selects a phoneme and a target cluster to which the selected phoneme may be moved. Then, in step s207, the system calculates what the probability given in equation (5) would be if the selected phoneme is moved into the target cluster. Then in step s209, the system compares this new probability calculated in step s207 with the probability for the current configuration which was calculated in step s203. If the new probability is higher than the probability for the current configuration, then the processing passes to step s211 where the system moves the selected phoneme to the target cluster to replace the current configuration. The processing then proceeds to step s213 where the system determines whether or not the probability calculated for the new configuration is better than the "best ever" probability. If it is, then the processing proceeds to step s215 where the system stores the current configuration as the best ever configuration that it has encountered. Otherwise step s215 is skipped and the processing proceeds to step s219 where the system determines whether or not convergence has been reached.

If at step s209, the system determines that the new probability is not higher than the probability for the current configuration, then the processing proceeds to step s217 where the system moves the selected phoneme to the target cluster to replace the current configuration with a probability dependent upon the difference between the new probability and the probability for the current configuration. For example, a difference probability can be defined as:

$$d = \frac{1}{2} e^{-\lambda(s_1 - s_2)} \quad (6)$$

where $s_1$ is the probability determined for the current configuration and $s_2$ is the probability for the proposed new configuration and $\lambda$ is a parameter which can be tuned to get best performance. Therefore, when the two probabilities are the same d=½ and when the probability for the new configuration is massively worse than the probability for the current configuration d will be approximately equal to zero. Then if a random number generator is used which randomly picks a number between zero and one, then the proposed configuration will replace the current configuration if d>r, otherwise the proposed configuration is discarded.

After step s217, the system proceeds to step s219 where it determines whether or not convergence has been reached. If it has, then the processing ends and the phoneme clusters are stored. If convergence has not been reached, then the processing proceeds to step s221 where a random value (RV) between zero and one is chosen and then compared with a threshold (Th) in step s223. If the random value, RV, is less than the threshold then the processing returns to step s205 above and the procedure is repeated. On the other hand, if the random value, RV is not less than the threshold, then the processing proceeds to step s225 where the best ever configuration is copied into the current configuration and then the processing again returns to step s205. However, by setting the threshold Th to be close to one ensures that the best ever configuration is only copied into the current configuration very occasionally. As those skilled in the art will appreciate the processing of steps s221 to s225 is provided to try and ensure that the system does not remain stuck in a local minimum.

The inventors have found that performing this clustering algorithm for the English phoneme set with ten clusters and for a given user, when the decodings come from the automatic speech recognition unit 51, gives the following phoneme clusters:

$c_1$={aa ae ah aw eh ey uw}

$c_2$={ao l oy r w}

$c_3$={d dh t th}

$c_4$={ax ea er hh oh ow ua}

$c_5$={m sil}

$c_6$={b f p v}

$c_7$={s z}

$c_8$={ch g jh k sh zh}

$c_9$={n ng}

$c_{10}$={ay ia ih iy uh y} and when the decodings come from the phonetic transcription unit 75, gives the following phoneme clusters:

$c_1$={aa ae ah aw eh ey uh uw}

$c_2$={ao l oy r w}

$c_3$={d dh t th}

$c_4$={ax ea er hh oh ow ua}

$c_5$={m sil}

$c_6$={b f p v}

$c_7$={s z}

$c_8$={ch g jh k sh zh}

$c_9$={n ng}

$c_{10}$={ay ia ih iy y}

As those skilled in the art will appreciate, the phoneme clusters for the text to phoneme transcription unit 75 are predominantly the same as those for the automatic speech recognition 51, with the exception of the "uh" phone which is in cluster $c_1$ while it is in cluster $c_9$ for the clusters of the automatic speech recognition unit 51. As those skilled in the art will appreciate, the clusters given above are given by way of example only. The precise clusters that are used will depend on the matching method used to compare the phonemes in the clusters.

Alternative Embodiments

In the above embodiment, the document database 29, the annotation database 31 and the speech recognition unit 51 were all located within the user terminal 59. As those skilled in the art will appreciate, this is not essential. FIG. 10 illustrates an embodiment in which the document database 29 and the search engine 53 are located in a remote server 60 and in which the user terminal 59 accesses the database 29 via the network interface unit 67 and 69 and a data network 68 (such as the Internet). In this embodiment, both the documents and the annotations are stored in the database 29. In this embodiment, the user terminal 59 can only receive voice queries from the microphone 7. These queries are converted into phoneme and word data by the automatic speech recognition unit 51. This data is then passed to the control unit 55 which controls the transmission of data over the data network 68 to the search engine 53 located within the remote server 60. The search engine 53 then uses the phoneme index to carry out a search in the database 29 in a similar manner to the way in which the search was performed in the above embodiment. The results of the search are then transmitted back from the search engine 53 to the control unit 55 via the data network 68. The control unit 55 then considers the search results received back from the network and displays appropriate data on the display 57 for viewing by the user 39.

In addition to locating the database 29 and the search engine 53 in the remote server 60, it is also possible to locate the automatic speech recognition unit 51 in the remote server 60. Such an embodiment is shown in FIG. 11. As shown, in this embodiment, the input voice query from the user is passed via input line 61 to a speech encoding unit 73 which is operable to encode the speech for efficient transfer through the data network 68. The encoded data is then passed to the control unit 55 which transmits the data over the network 68 to remote server 60, where it is processed by the automatic speech recognition unit 51. In this embodiment, the speech recognition unit is operable to only generate phoneme data which is then passed to the search engine for use in searching the database 29 using the phoneme index 35. The search results generated by the search engine are then passed, via the network interface 69 and the network 68, back to the user terminal 59. The search results received back from the remote server are then passed via the network interface unit 67 to the control unit 55 which analyses the results and generates and displays appropriate data on the display 57 for viewing by the user 39.

In a similar manner, a user terminal 59 may be provided which only allows typed inputs from the user and which has the search engine and the database located in the remote server. In such an embodiment, the phonetic transcription unit 75 may be located in the remote server 60 as well.

In the above embodiment, the annotation database and the document database were separate. As those skilled in the art will appreciate, in some embodiments, the annotation database and the document database may form a single database. Additionally, the annotations in the annotation database may form the data to be retrieved.

In the above embodiment, the annotation database was searched using both phonemes and words. As those skilled in the art will appreciate, the phoneme index described above and its use in searching the annotation database may be used in a system which does not search using words as well.

In the above embodiment, a phoneme index was described. As those skilled in the art will appreciate, the above technique can be used for features other than phonemes, such as phones, syllables or katakana (Japanese alphabet) or any other sub-word unit of speech. This indexing technique could also be used in other applications, such as the indexing of DNA sequences and the like.

In the above embodiment, a hash indexing technique has been described. As those skilled in the art will appreciate, other indexing techniques can be used in order to identify portions of the database for carrying out a detailed phoneme search using phoneme data generated from the input query.

In the above embodiment, the function defined in equation (1) above was used to define the mapping between the cluster trigram and the entry in the table. However, with this technique, if C[1] or C[2] or C[3] equals zero then this will yield zero. Instead, the function used could be:

$$(C[3]+K_c(C[2]+K_c C[1])) \bmod S \quad (7)$$

or, for a general N-gram of length n:

$$\left(\sum_{i=1}^{n} K_c^{(n-i)} \cdot C[i]\right) \bmod S \quad (8)$$

In the above embodiment, the pointers stored in the index were of the form n[p,q,r], where p is the annotation for document p, q is the $q^{th}$ block of nodes within that annotation and r is the $r^{th}$ node within that block. As those skilled in the art will appreciate, other types of pointers could be used. For example, the count of the node since the start of the lattice or the time and rank (where more than one node have the same time) of the relevant nodes could be used.

In the above embodiment, when the query is being applied to the index, each of the query cluster trigrams were applied to the index and the appropriate entries found. These entries were then compared in order to identify portions of the phoneme lattice for further searching. Alternatively, the processing of the query cluster trigrams may be performed incrementally, i.e. identify all the entries for the first query trigram, then obtain those for the second query trigram and retain those which are close in time to those of the first trigram etc.

In the above embodiment, when identifying regions where successive cluster trigrams occur close in time, the system compared the node numbers in the pointers which are retrieved. However, in some embodiments, it is better to compare the time offsets stored for the nodes. This is because in some applications, the lattice will have many branches and two nodes which are very close in time could have completely different node numbers. The aim of this part of the system is to identify cluster trigrams which are in chronological order within the annotation and which occur within a limited period of time of each other. In this way, if there is an error in a trigram, it will only result in two to three trigram misses. Consequently, the time leeway should be comparable to about four or five phonemes which is about 0.2 to 0.3 seconds.

What is claimed is:

1. An apparatus for identifying one or more portions of data in a database for comparison with a query input by a user, the query and the portions of data each comprising a sequence of sub-word units, said apparatus comprising:
   a memory for storing data defining a plurality of sub-word unit classes, each class comprising sub-word units that are confusable with other sub-word units in the same class;
   a memory for storing an index having a plurality of entries, each entry having an associated identifier for identifying the entry and each entry comprising:
      a key associated with the entry and which is related to the identifier for the entry in a predetermined manner; and
      a number of pointers which point to portions of data in the database which correspond to the key associated with the entry,
      wherein each key comprises a sequence of sub-word unit classifications which is derived from a corresponding sequence of sub-word units appearing in the database by classifying each of the sub-word units in the sequence into one of the plurality of sub-word unit classes;
   means for classifying each of the sub-word units in the input query into one of the plurality of sub-word unit classes and for defining one or more sub-sequences of query sub-word unit classifications;
   means for determining a corresponding identifier for an entry in the index for each of the one or more sub-sequences of query sub-word unit classifications;
   means for comparing the key associated with each of the determined identifiers determined by said determining means with the corresponding sub-sequence of query sub-word unit classifications; and
   means for retrieving one or more pointers from the index in accordance with the output of said comparing means, which one or more pointers identify the one or more portions of data in the database for comparison with the input query.

2. An apparatus according to claim 1, wherein the sub-word units are phonemes.

3. An apparatus according to claim 1, wherein at least ten sub-word unit classes are defined in advance.

4. An apparatus according to claim 1, wherein each key is related to the corresponding identifier by a predetermined mathematical function.

5. An apparatus according to claim 4, wherein each key is related to the corresponding identifier by the following equation:

$$\left(\prod_{i=1}^{W}[C[i]K_c]\right) \text{Mod } S,$$

where $K_c$ is the number of sub-word unit classes, S is the number of entries in the index, C is the number of the sub-word class to which the $i^{th}$ sub-word unit in the sequence of sub-word units corresponding to the key belongs, and W is the number of sub-word unit classifications in each key.

6. An apparatus according to claim 4, wherein said determining means is operable to determine a corresponding identifier for each subsequence of query sub-word unit classifications using the predetermined mathematical function.

7. An apparatus according to claim 4, wherein each key is related to the corresponding identifier by the following equation:

$$\left(\sum_{i=1}^{n} K_c^{(n-i)} \cdot C[i]\right) \text{Mod } S$$

where $K_c$ is the number of sub-word unit classes, S is the number of entries in the index, C is the number of the sub-word class to which the $i^{th}$ sub-word unit in the sequence of sub-word units corresponding to the key belongs, and n is the number of sub-word unit classifications in each key.

8. An apparatus according to claim 1, wherein said determining means is operable to identifier a new identifier for another entry in the index for a subsequence of query sub-word unit classifications if said comparing means determines that the key for the identifier is not the same as the subsequence of query sub-word unit classifications.

9. An apparatus according to claim 8, wherein said determining means is operable to determine a new identifier using the following equation:

$$IDX=[IDX+V] \text{Mod } S,$$

where IDX is the identifier, S is the number of entries in the index, and V is a predetermined number.

10. An apparatus according to claim 1, wherein the key for one or more of the entries is a null key indicating that there are no pointers stored in the index for that entry.

11. An apparatus according to claim 1, wherein the input query is a spoken query and said apparatus further comprises a speech recognition system for processing the spoken query and for outputting the sequence of sub-word units.

12. An apparatus for searching a database in response to a query input by a user, the database comprising a plurality of sequences of sub-word units and the query comprising at least one sequence of sub-word units, said apparatus comprising:
   an apparatus according to any of claims 1 to 11 for identifying one or more portions of data in the database for comparison with the input query; and
   means for comparing the one a more sequences of query sub-word units with the identified one or more portions of data in the database.

13. An apparatus according to claim 12, wherein said means for comparing the input query with the portions of data in the database uses a dynamic programming comparison technique.

14. An apparatus according to claim 12, further comprising means for retrieving one or more data files in accordance with the results of said comparing means.

15. An apparatus according to claim 1, wherein the input query is a typed query and said apparatus further comprises means for converting the typed query into the sequence of sub-word units.

16. An apparatus for identifying one or more portions of data in a database for comparison with a query input by a user, the query and the portions of data each comprising a sequence of features, said apparatus comprising:
   a memory for storing data defining a plurality of feature classes, each class comprising features that are confusable with other features in the same class;
   a memory for storing an index having a plurality of entries, each entry having an associated identifier for identifying the entry and each entry comprising:
      a key associated with the entry and which is related to the identifier for the entry in a predetermined manner; and
      a number of pointers which point to portions of data in the database which correspond to the key associated with the entry,
      wherein each key comprises a sequence of feature classifications which is derived from a corresponding sequence of features appearing in the database by classifying each of the features in the sequence into one of the plurality of feature classes;
   means for classifying each of the features in the input query into one of the plurality of feature classes and for defining one or more sub-sequences of query feature classifications;
   means for determining a corresponding identifier for an entry in the index for each of the one or more sub-sequences of query feature classifications;
   means for comparing the key associated with each of the determined identifiers determined by said determining means with the corresponding sub-sequence of query feature classifications; and
   means for retrieving one or more pointers from the index in accordance with the output of said comparing means, which one or more pointers identify the one or more portions of data in the database for comparison with the input query.

17. A method of identifying one or more portions of data in a database for comparison with a query input by a user, the query and the portions of data each comprising a sequence of sub-word units, the method comprising the steps of:
   storing data defining a plurality of sub-word unit classes, each class comprising sub-word units that are confusable with other sub-word units in the same class;
   storing an index having a plurality of entries, each entry having an associated identifier for identifying the entry,
      a key associated with the entry and which is related to the identifier for the entry in a predetermined manner, and
      a number of pointers which point to portions of data in the database which correspond to the key associated with the entry,
      wherein each key comprises a sequence of sub-word unit classifications which is derived from a corresponding sequence of sub-word units appearing in the database by classifying each of the sub-word units in the sequence into one of the plurality of sub-word unit classes;
   classifying each of the sub-word units in the input query into one of the plurality of sub-word unit classes and for defining one or more sub-sequences of query sub-word unit classifications;
   determining a corresponding identifier for an entry in the index for each of the one or more sub-sequences of query sub-word unit classifications;
   comparing the key associated with each of the determined identifiers determined in said determining step with the corresponding sub-sequence of query sub-word unit classifications; and
   retrieving one or more pointers from the index in accordance with the output of said comparing step, which one or more pointers identify the one or more portions of data in the database for comparison with the input query.

18. A method according to claim 17, wherein the sub-word units are phonemes.

19. A method according to claim 17, wherein at least ten sub-word unit classes are defined in advance.

20. A method according to claim 17, wherein each key is related to the corresponding identifier by a predetermined mathematical function.

21. A method according to claim 20, wherein each key is related to the corresponding identifier by the following equation:

$$\left(\prod_{i=1}^{W}[C[i]K_c]\right) \text{Mod } S$$

where $K_c$ is the number of sub-word unit classes, S is the number of entries in the index, C is the number of the sub-word class to which the $i^{th}$ sub-word unit in the sequence of sub-word units corresponding to the key belongs, and W is the number of sub-word unit classifications in each key.

22. A method according to claim 20, wherein each key is related to the corresponding identifier by the following equation:

$$\left(\sum_{i=1}^{n} K_c^{(n-i)} \cdot C[i]\right) \text{Mod } S$$

where $K_c$ is the number of sub-word unit classes, S is the number of entries in the index, C is the number of the sub-word class to which the $i^{th}$ sub-word unit in the sequence of sub-word units corresponding to the key belongs, and n is the number of sub-word unit classifications in each key.

23. A method according to claim 17, wherein said determining step identifies a new identifier for another entry in the index for a subsequence of query sub-word unit classifications if said comparing step determines that the key for the identifier is not the same as the subsequence of query sub-word unit classifications.

24. A method according to claim 23, wherein said determining step determines a new identifier using the following equation:

$$IDX=[IDX+V] \text{ Mod } S,$$

where IDX is the identifier, S is the number of entries in the index, and V is a predetermined number.

25. A method according to claim 24, wherein said determining step determines a corresponding identifier for each subsequence of query sub-word unit classifications using the predetermined mathematical function.

26. A method according to claim 17, wherein the input query is a typed query and wherein the method further comprises a step of converting the typed query into the sequence of sub-word units.

27. A method according to claim 17, wherein the input query is a spoken query and wherein the method further comprises a step of using a speech recognition system to process the spoken query to generate the sequence of sub-word units.

28. A method of searching a database in response to a query input by a user, the database comprising a plurality of sequences of sub-word units and the query comprising at least one sequence of sub-word units, said method comprising:
  method steps of claim 17 for identifying one or more portions of data in the database for comparison with the input query; and
  a step of comparing the one or more sequences of query sub-word units with the identified one or more portions of data in the database.

29. A method according to claim 28, wherein said comparing step uses a dynamic programming comparison technique to compare the input query with the portions of data.

30. A method according to claim 28, further comprising a step of retrieving one or more data files in dependence upon the results of said comparing step.

31. A method according to claim 17, wherein the key for one or more of the entries is a null key indicating that there are no pointers stored in the index for that entry.

32. An apparatus for identifying one or more portions of data in a database for comparison with a query input by a user, the query and the portions of data each comprising a sequence of sub-word units, the apparatus comprising:
  a first memory operable to store data defining a plurality of sub-word unit classes, each class comprising sub-word units that are confusable with other sub-word units in the same class;
  a second memory operable to more an index having a plurality of entries, each entry having an associated identifier for identifying the entry and each entry comprising:
    a key associated with the entry and which is related to the identifier for the entry in a predetermined manner; and
    a number of pointers which point to portions of data in the database which correspond to the key for the entry;
    wherein each key comprises a sequence of sub-word unit classifications which is derived from a corresponding sequence of sub-word units appearing in the database by classifying each of the sub-word units in the sequence into one of the plurality of sub-word unit classes;
  a classifier operable to classify each of the sub-word units in the input query into one of the plurality of sub-word unit classes and to define one or more sub-sequences of query sub-word unit classifications;
  a determiner operable to determine a corresponding identifier for an entry in the index for each of the one or more sub-sequences of query sub-word unit classifications;
  a comparator operable to compare the key associated with each of the determined identifiers determined by said determiner with the corresponding sub-sequence of query sub-word unit classifications; and
  a retriever operable to retrieve one or more pointers from the index in accordance with the output of said comparator, which one or more pointers identify the one or more portions of data in the database for comparison with the input query.

33. An apparatus according to claim 32 wherein the sub-word units are phonemes.

34. An apparatus according to claim 32 wherein at least ten sub-word unit classes are defined in advance.

35. An apparatus according to claim 32 wherein each key is related to the corresponding identifier by a predetermined mathematical function.

36. An apparatus according to claim 35, wherein each key is related to the corresponding identifier by the following equation:

$$\left(\prod_{i=1}^{W} [C[i]K_c]\right) \text{Mod } S$$

where $K_c$ is the number of sub-word unit classes, S is the number of entries in the index, C is the number of the sub-word class to which the $i^{th}$ sub-word unit in the sequence of sub-word units corresponding to the key belongs, and W is the number of sub-word unit classifications in each key.

37. An apparatus according to claim 35, wherein each key is related to the corresponding identifier by the following equation:

$$\left(\sum_{i=1}^{n} K_c^{(n-i)} \cdot C[i]\right) \text{Mod } S$$

where $K_c$ is the number of sub-word unit classes, S is the number of entries in the index, C is the number of the sub-word class to which the $i^{th}$ sub-word unit in the sequence of sub-word units corresponding to the key belongs, and n is the number of sub-word unit classifications in each key.

38. An apparatus according to claim 35, wherein said determiner is operable to determine a corresponding identifier for each subsequence of query sub-word unit classifications using the predetermined mathematical function.

39. An apparatus according to claim 32, wherein said determiner is operable to identify a new identifier for another entry in the index for a subsequence of query sub-word unit classifications if said comparator determines that the key for the identifier is not the same as the subsequence of query sub-word unit classifications.

40. An apparatus according to claim 39, wherein said determiner is operable to determine a new identifier using the following equation:

$$IDX=[IDX+V] Mod\ S,$$

where IDX is the identifier, S is the number of entries in the index, and V is a predetermined number.

41. An apparatus according to claim 32, wherein the key for one or more of the entries is a null key indicating that there are no pointers stored in the index for that entry.

42. An apparatus according to claim 32, wherein the input query is a typed query and said apparatus further comprises a converter operable to convert the typed query into the sequence of sub-word units.

43. An apparatus according to claim 32, wherein the input query is a spoken query and said apparatus further comprises a speech recognition system operable to process the spoken query and to output the sequence of sub-word units.

44. An apparatus for searching a database in response to a query input by a user, the database comprising a plurality of sequences of sub-word units and the query comprising at least one sequence of sub-word units, said apparatus comprising:

an apparatus according to claim 32 operable to identify one or more portions of data in the database for comparison with the input query; and a sequence comparator operable to compare the one or more sequences of query sub-word units with the identified one or more portions of data in the database.

45. An apparatus according to claim 44, wherein said sequence comparator is operable to compare the input query with the portions of data in the database using a dynamic programming comparison technique.

46. An apparatus according to claim 44, further comprising a data file retriever operable to retrieve one or more data files in accordance with the results of said sequence comparator.

47. An apparatus for identifying one or more portions of data in a database for comparison with a query input by a user, the query and the portions of data each comprising a sequence of features, said apparatus comprising:

a first memory operable to store data defining a plurality of feature classes, each class comprising features that are confusable with other features in the same class;

a second memory operable to store an index having a plurality of entries, each entry having an associated identifier for identifying the entry and each entry comprising:

a key associated with the entry and which is related to the identifier for to entry in a predetermined manner; and a number of pointers which point to portions of data in the database which correspond to the key for the entry, wherein each key comprises a sequence of feature classifications which is derived from a corresponding sequence of features appearing in the database by classifying each of the features in the sequence into one of the plurality of feature classes;

a classifier operable to classify each of the features in the input query into one of the plurality of feature classes and to define one or more sub-sequences of query feature classifications;

a determiner operable to determine a corresponding identifier for an entry in said index for each of said one or more sub-sequences of query feature classifications;

a comparator operable to compare the key associated with each of the determined identifiers determined by said determiner with the corresponding sub-sequence of query feature classifications; and a retriever operable to retrieve one or more pointers from the index in accordance with the output of said comparator, which one or more pointers identify the one or more portions of data in the database for comparison with the input query.

48. A storage medium storing computer readable program code for executing a method of controlling a processor to identify one or more portions of data in a database for comparison with a query input by a user, the query and the portions of data each comprising a sequence of sub-word units, said program code comprising:

code for storing data defining a plurality of sub-word unit classes, each class comprising sub-word units that are confusable with other sub-word units in the same class;

code for storing an index having a plurality of entries, each entry having an associated identifier for identifying the entry and each entry comprising:

a key associated with the entry and which is related to the identifier for the entry in a predetermined manner, and a number of pointers which point to portions of data in the database which correspond to the key for the entry, wherein each key comprises a sequence of sub-word unit classifications which is derived from a corresponding sequence of sub-word units appearing in the database by classifying each of the sub-word units in the sequence into one of the plurality of sub-word unit classes;

code for classifying each of the sub-word units in the input query into one of the plurality of sub-word unit classes and defining one or more sub-sequences of query sub-word unit classifications;

code for determining a corresponding identifier for an entry in the index for each of the one or more sub-sequences of query sub-word unit classifications;

code for comparing the key associated with each of the determined identifiers determined by said determining code with the corresponding sub-sequence of query sub-word unit classifications; and code for retrieving one or more pointers from the index in accordance with the output by said comparing code, which one or more pointers identify the one or more portion of data in the database for comparison with the input query.

* * * * *

UNITED STATES PATENT AND TRADEMARK OFFICE
CERTIFICATE OF CORRECTION

PATENT NO. : 6,873,993 B2
DATED : March 29, 2005
INVENTOR(S) : Jason Peter Andrew Charlesworth et al.

It is certified that error appears in the above-identified patent and that said Letters Patent is hereby corrected as shown below:

<u>Title page,</u>
Item [56], References Cited, OTHER PUBLICATIONS,
"Steven Bird, et al.," reference, "A" should read -- "A -- and "Annotation," should read -- Annotation," --;
"L.R. Bahl et al.," reference, "Tansactions" should read -- Transactions --;
"Srinivasan et al." reference, "Phonetic confusion matrix based spoken document retrieval", ACM 2000, pp. 81087.*" (first occurrence) should be deleted;
"S. Srinivasan et al.," reference, "Retrival" should read -- Retrieval --;
"J. Zobel et al." reference "XP00087022." should read -- XP000870222. --;
"Yutaka Kobayashi et al:" reference, "CH2118 - /8/85/000 - 1597," should read -- CH2118 - 8/85/0000 - 1597, --; and
"G. Micca et al:" reference, "Fierence," should read -- Firenze, --.

<u>Column 11,</u>
Line 27, "phone" should read -- phoneme --.

<u>Column 14,</u>
Line 34, "identifier" should read -- identify --; and
Line 60, "a" should read -- or --.

<u>Column 17,</u>
Line 39, "more" should read -- store --.

<u>Column 19,</u>
Line 34, "to" should read -- the --.

UNITED STATES PATENT AND TRADEMARK OFFICE
CERTIFICATE OF CORRECTION

PATENT NO. : 6,873,993 B2
DATED : March 29, 2005
INVENTOR(S) : Jason Peter Andrew Charlesworth et al.

It is certified that error appears in the above-identified patent and that said Letters Patent is hereby corrected as shown below:

Column 20,
Line 48, "portion" should read -- portions --.

Signed and Sealed this

Sixth Day of June, 2006

JON W. DUDAS
*Director of the United States Patent and Trademark Office*